(12) United States Patent
Bhullar et al.

(10) Patent No.: US 7,270,013 B2
(45) Date of Patent: Sep. 18, 2007

(54) DISPENSER VOLUME DETERMINATION METHOD

(75) Inventors: Balwant S. Bhullar, LaVista, NE (US); Daniel T. Bourne, LaVista, NE (US)

(73) Assignee: Streck, Inc., La Vista, NE (US)

( * ) Notice: Subject to any disclaimer, the term of this patent is extended or adjusted under 35 U.S.C. 154(b) by 110 days.

(21) Appl. No.: 11/095,298

(22) Filed: Mar. 31, 2005

(65) Prior Publication Data

US 2006/0225483 A1  Oct. 12, 2006

(51) Int. Cl.
*G01F 25/00* (2006.01)
*G01F 13/00* (2006.01)
*G01F 22/00* (2006.01)
*G01N 21/84* (2006.01)
*G01N 21/93* (2006.01)

(52) U.S. Cl. ............... 73/861; 73/1.74; 702/100
(58) Field of Classification Search ........... 73/1.74, 73/861, 861.04, 149; 356/128; 702/50, 702/100
See application file for complete search history.

(56) References Cited

U.S. PATENT DOCUMENTS

| | | | |
|---|---|---|---|
| 4,354,376 A | 10/1982 | Greenfield et al. | |
| 5,061,639 A | 10/1991 | Lung et al. | |
| 5,298,978 A | 3/1994 | Curtis et al. | |
| 5,492,673 A | 2/1996 | Curtis et al. | |
| 6,553,824 B1 | 4/2003 | Lutze | |
| 6,741,365 B2 | 5/2004 | Curtis | |
| 6,804,985 B2 | 10/2004 | Luchinger | |
| 2003/0213297 A1* | 11/2003 | Sage et al. | ........... 73/861 X |

OTHER PUBLICATIONS

Product Literature regarding VC-100 Aug. 2, 2005 (15 pages).
Product Literature regarding Tri-Seal, www.tri-seal.com, Aug. 5, 2004 (5 pages).
RRA J Series User Manual, Oct. 14, 2003, 7.04 pp. 17-18.
RRA J Series User Manual, Oct. 14, 2003, 7.04 pp. 25-27.
Product Literature regarding the J57 Series of Automatic Refractometers, Rudolph Research Analytical, (4 pages) Mar. 2005.
ICUMSA Specification and Standard, Refractometry and Tables-Official, Last Revised 1998, (15 pages) Feb.

* cited by examiner

*Primary Examiner*—Thomas P. Noland
(74) *Attorney, Agent, or Firm*—Dobrusin & Thennisch PC

(57) ABSTRACT

The present invention includes methods of determining the volume of liquid dispensed by a dispenser. Initially, a refractive index analysis is preformed on a first liquid that has been dispensed from the dispenser in question. From the refractive index analysis, information is obtained about the volume of first liquid dispensed. The invention also includes methods for verifying the volumetric accuracy of a dispenser. The methods include dispensing a first liquid having a known refractive index into a vessel having a second liquid with a known volume and a known refractive index to form a test mixture. The refractive index of the test mixture is measured and then correlated with the refractive index of the first liquid to obtain information about the volume of first liquid dispensed. The dispensed volume is then compared to the theoretical volume of liquid dispensed by the dispenser.

13 Claims, No Drawings

DISPENSER VOLUME DETERMINATION METHOD

FIELD OF THE INVENTION

This invention relates to methods and systems for determining the volumetric accuracy of a liquid dispensing device. More particularly, this invention relates to methods and system for pipette volume verification using a refractometer.

BACKGROUND OF THE INVENTION

Many routine, as well as specialized, operations in a typical laboratory require the transfer of known volumes of liquids. It is often important to ensure that the liquid dispensing devices perform within pre-established specifications. International guidelines have been established with regard to acceptable tolerances for various types of liquid dispensing devices. Users of these devices usually establish a routine for accuracy verification of their devices which includes periodic testing.

Several prior art techniques are commonly used for volumetric verifications including gravimetry, photometry and volumetry. Each of these techniques has one or more drawbacks that may be desirable to overcome.

For example, gravimetry is time consuming and is susceptible to error because a highly controlled environment is required. Heat from an operator's hand is a potential source of error. Photometry, due to Beer's law of absorbance, requires several different reference dye solutions to cover an appreciable range of delivery volumes. Also, a skilled technician is required to operate the spectrophotometer. Volumetry, essentially an acid-base titration, is likewise subject to operator and other sources of potential error.

SUMMARY OF THE INVENTION

The present invention overcomes one or more of above problems, by providing improved methods and systems for determining the volume of liquid dispensed by a dispenser. A refractive index analysis is preformed on a first liquid that has been dispensed from the dispenser in question. From the refractive index analysis, information is obtained about the dispensing volume of the dispenser. The invention also includes methods for verifying the volumetric accuracy of a dispenser. The methods include dispensing a first liquid having a known refractive index into a vessel having a second liquid with a known volume and a known refractive index to form a test mixture. Alternately, the method includes dispensing the second liquid into a vessel having a first liquid with a known refractive index and known volume to form the test mixture. The RI of the test mixture is measured and then correlated with the RI of the first liquid to obtain information about the volume of first liquid dispensed. The dispensed volume may then be compared to the theoretical volume of liquid dispensed by the dispenser, and the dispenser can be calibrated or concentration amounts adjusted to take into account for any discrepancy.

DETAILED DESCRIPTION

The present invention includes methods of determining the volume of liquid dispensed by a liquid dispenser and also methods of verifying the volumetric dispensing of a liquid. The present invention also includes systems for carrying out the methods, kits that contain the necessary components to carry out the methods as well as methods of providing a dispenser verification service.

While typically used to determine volumes dispensed by pipettes, all manner of liquid dispensers may have their dispensed volumes determined using these methods, including burettes, flasks, graduated cylinders, syringes, or the like. The material of the liquid dispenser being tested by the present methods is not critical, as glass, plastic, metal, similar materials or combinations thereof may make up part or all of the liquid dispenser being tested. The methods may be utilized to test dispensers that are operated manually, semi-automatically, automatically (e.g. robotic), dispensers that are single channel, multi-channel or any combination thereof.

The volume determination method includes performing a refractive index (RI) analysis of a liquid dispensed from the dispenser in question. A typical RI analysis includes measuring the change in the speed of light from a suitable light source as it passes from one medium to at least another medium.

The RI analysis may be conducted according to known systems, techniques and procedures. A suitable instrument will typically include a test cell on or into which a volume of test sample may be dispensed. The test cell preferably will include a flat surface, and more preferably one that is free of cracks, crevices, slits, grooves or other surface discontinuities having a tendency to collect fluid and that will render cleaning between tests difficult. The test cell is in optical communication with at least one prism (e.g., glass, artificial sapphire or otherwise that has a hardness of at least 6 on the Moh's scale, and more preferably at least 8). A light source is included so that light can be directed through the prism and the test sample. A detector, in direct or indirect optical communication, is also included for monitoring light that is passed through the test sample, reflected from the test sample, or both. Suitable electronics will control the operation of the light source and detector and will also preferably provide an output signal that can be correlated with the RI. In this regard, the refractometer itself may have a visual display or other output device for specifying RI readings. The instrument alternatively may be programmed with known information about the test sample, so that upon detection of light through the sample, the electronics execute an algorithm, performs a comparison with one or more stored data points or a like operation, in order to correlate the light detected with a volume value, so that the volume value is reported to the user (e.g. in real time), as discussed in more detail below. Data output from the instrument may be transferred to a computer, display device (e.g. a monitor), printer, other visual indicator (e.g. a light) or audible indicator (e.g. a beep).

In another aspect, the instrument may be signally linked with a data network, and the output signal or associated data is transmitted via a data network, such as an intranet, an extranet, the internet or otherwise. Thereafter, a report may be rendered to the user, and optionally stores the information for subsequent retrieval (e.g., for historical comparison of data about a particular measuring device).

In a preferred method, the RI analysis is conducted by an automated refractometer. In one embodiment, the RI is measured by a refractometer capable of read outs down to at least the third decimal place, the fourth decimal place, the fifth decimal place or beyond. Because the RI is dependent on temperature, the analysis is carried out at a standard temperature, e.g. 15, 20, 25, 30° C. or the like, which may be controlled by the refractometer device itself or an associated peripheral device. If temperature is not standardized, the temperature variation of the RI may be corrected for using known techniques. Suitable refractometers include those provided by Rudolph Research Analytical (Flanders, N.J.) such as their J57, J157 or J257 models or those provided by AFAB Enterprises (Eustis, Fla.).

In another embodiment, the refractometer may be a general purpose refractometer that is useful for determining the RI of a variety of materials over a wide range of RI. Alternately, the refractometer may be a limited or essentially single purpose refractometer that is configured and tuned specifically for measuring RI over fixed range of RIs, a lesser range of RIs or for determining the RI of a specific test mixture (e.g. one containing $CaCl_2$). In this manner, it may be possible to employ a relatively low cost refractometer reliably in the present invention.

In one embodiment, a first liquid (particularly a standard liquid), having a known RI but an unknown volume, is dispensed from the dispenser being analyzed into a second liquid (e.g. a base liquid), having a known RI and a known initial volume. The first and second liquids form a test mixture. The RI of the test mixture is then measured using the refractometer. In another embodiment, the second liquid is dispensed from the dispenser into a known volume of the first liquid (namely, a standard liquid having a known RI). In another embodiment, a first liquid having a known RI is dispensed into a container into which a known volume of a second liquid (with a known RI) is also dispensed, or vice versa.

The first liquid, and particularly any standard liquid, is preferably a solution that has a RI: i) that exhibits a relatively high RI, e.g. greater than about 1.00000, greater than about 1.20000, greater than about 1.40000, greater than about 1.60000, greater than about 1.80000, greater than about 2.00000, etc.; (ii) that has a viscosity that approximates that of water; or a combination of i) and ii). In one embodiment, the first liquid is an aqueous solution, and particularly an aqueous salt solution, although any liquid may be used. Suitable solutes for the solution include any ionic compound with metallic salts being more preferred and alkali metal and/or alkaline earth metal salts being most preferred. Halides, oxides, nitrates, nitrites, sulfides, sulfates, imides, amides, ammoniums, and other anions are suitable. Preferred salts include calcium chloride, potassium iodide, magnesium chloride, chromium chloride, chromium sulfate, copper sulfate, calcium bromide, barium bromide, or the like being preferred. Other suitable solutes may include sugars (e.g. sucrose), surfactants (e.g. PEG), oils, alcohols, polyols (e.g. glycerol), acids (e.g. picric acid), melamine or the like. Alcohols may be used to alter solubility of the first liquid or alter (e.g. raise) the RI of the first liquid. Other chemicals, such as chlorofluorocarbons and fluoride rings, may also be used to alter (e.g. lower) the RI of the water. Indeed, several chemicals could be used in combination to have an additive affect on the RI.

In one preferred approach, the first liquid is a solution of $CaCl_2$. A variety of concentrations of solute may be used. For example, a concentration of solute between about 10 wt % and 70 wt % may be suitable. Preferably, the range of solute is between about 20 wt % and about 60 wt %, between about 30 wt % and about 50 wt %, and between about 35 wt % and about 45 wt %. More preferably the concentration is about 36 wt %, about 37 wt %, about 38 wt %, about 39 wt %, about 40 wt %, about 41 wt %, about 42 wt %, about 43 wt %, and about 44 wt %. Most preferably, the first liquid is a 40% by weight solution of $CaCl_2$ in water and has a RI of 1.44200.

The second liquid is preferably a neat liquid, although liquids containing solutes, inert media (e.g. glass beads), or the like may also be acceptable. Preferably, the solvent for the first liquid and the liquid of the second liquid are the same liquid (e.g. water). In a more preferred embodiment, the second liquid is neat water and most preferably the second liquid is tap, deionized or distilled water. Preferably, the volume of the second liquid is known accurately down to the third, fourth, or even more preferably to the fifth decimal place (e.g. 0.0000#). Though other volumes may be employed (e.g. 0.50000 ml, 3.00000 ml, 5.00000 ml, 7.00000 ml, 10.00000, etc.), in one preferred embodiment, 1.00000 ml of deionized water is used as the second liquid.

Without intending to be bound by theory, the present invention is based on the recognition that the RI of a liquid with a solute is a function of the total solute concentration. Thus, diluting or concentrating a solution will change the RI such that the original liquids and resultant solution (e.g. test mixture) will not have the same RI relative to each other. Moreover, the invention is predicated upon the recognition that particular liquids will exhibit consistent and reproducible data that can be modeled for determining volumes that are dispensed, on the basis of readings from a refractometer.

The volume determination method also includes obtaining information about the volume dispensed from the dispenser based on the results of the RI analysis. Known information about the concentration of solute and the RI of the first liquid, about the volume and the RI of the second liquid and about the RI of the test mixture provides a starting point for obtaining information about the unknown volume dispensed by the dispenser. In particular, this known information may be correlated to the volume dispensed by the dispenser in question.

In one embodiment, the concentration of the test mixture is obtained through the use of a pre-established concentration curve for the test mixture. For example, a curve may be established by analyzing the RI of a series of test mixtures having a range of concentrations of solutes from the first liquid in the second liquid (or vice versa). Preferably, the establishment of the curve is carried under controlled conditions such as a standard temperature (e.g. 15° C., 20° C., 25° C., 30° C. or the like).

In one aspect of the invention, it has been discovered that, if mathematically modeled to a (poly)nomial and preferably a high order polynomial (e.g., greater than second, third fourth, fifth or sixth order polynomial), the known information can be employed to accurately determine the unknown volume dispensed by the liquid dispenser. The RI of the current test mixture is then fitted to the curve to obtain information about the concentration of solute from first liquid in the test mixture. From knowing the concentration in the test mixture, the volume dispensed by the dispenser in question is easily determined.

By way of illustration, one embodiment, the actual volume dispensed by the dispenser ($V_d$) may be calculated according to the following Equation I:

$$V_d = \frac{V_2 P_2 X}{P_1(X_1 - X)},$$

where $V_2$ is the volume of the second liquid, $P_2$ is density of the second liquid, $P_1$ is the density of the first liquid, $X_1$ is the concentration by weight or mass fraction of the solute in the first liquid and X is the concentration that results from the curve fitting of the RI of the test mixture. Alternately, X is calculated using at least one of the (poly)nomials discussed below, where (poly)nomial refers to first order nomials and second order and above polynomials. By way of example, if the second liquid is water, then the $P_2$ would be 0.9967. For a 40% solution of the first liquid, $X_1$ would be 0.4; for a 50% solution $X_1$ would be 0.5, etc. If the first liquid is a 40% solution of $CaCl_2$ in water the $P_1$ would be 1.3989.

Examples models that may be used to provide the curve to which the measured RI of the test mixture is fitted are: (1) X=4.0439958*(RI)−5.3896760; (2) X=4.0589381*(RI)−5.4097399; (3) X=−5.9664688*(RI)$^2$+20.1656833*(RI)−

16.2789886; (4) $X=-6.5107716*(RI)^2+21.6370398*(RI)-17.2732778$; (5) $X=20.1300736*(RI)^3-87.6785194*(RI)^2+130.7209134*(RI)-66.1358565$; (6) $X=-6.7410702*(RI)^3+20.8442871*(RI)^2-15.3627825*(RI)-0.5925527$; (7) $X=7009.9177514*(RI)^4-37895.0189120*(RI)^3+76812.3831320*(RI)^2-69186.4699112*(RI)+23363.7085834$; (8) $X=-5730.6124406*(RI)^4+30990.6445733*(RI)^3-62852.0123946*(RI)^2+56660.9637001*(RI)-19158.7797640$; (9) $X=107507.7129822*(RI)^5-719719.7579391*(RI)^4+1927066.5911364*(RI)^3-2579585.8473212*(RI)^2+1726333.5539729*(RI)-462075.9899227$; (10) $X=-264073.0073090*(RI)^5+1779183.5552220*(RI)^4-4794691.8250871*(RI)^3+6460311.5402652*(RI)^2-4352093.7951968*(RI)+1172691.7074280$; (11) $X=-138350175.0625000*(RI)^6+1121396736.4230500*(RI)^5-3787192750.5215800*(RI)^4+6821251494.8898800*(RI)^3-6910716233.0190500*(RI)^2+3733968261.7345800*(RI)-840614342.4085130$; and (12) $X=76647822.8750000*(RI)^6-621586251.0847190*(RI)^5+2100300177.5007600*(RI)^4-3784859079.4303100*(RI)^3+3836456215.9362600*(RI)^2-2073954273.7033100*(RI)+467139450.3667360$. Of course combinations of polynomials may also be used, and the invention is not limited to the above examples.

In a preferred embodiment, the RI is measured accurately down to the third, fourth, fifth or sixth decimal place. This provides the ability to determine the dispensed volume down to the level of hundred-thousands of the volume of second liquid. More specifically, if a 1.00000 ml basic liquid is utilized, then the dispensed volume can be calculated down to $\pm 0.00001$ ml or $\pm 0.01$ µl.

In a further preferred embodiment, the volume dispensed by the dispenser may be determined multiple times using multiple measurements of the RI of the same test mixture or using multiple test mixtures (e.g. 2, 3, 4, 5, 6, 7, 8, 9,10 or more test mixtures). Of course, multiple test mixtures could also have their RIs measured multiple times. Such multiple measurements and test mixtures may permit for a statistical analysis of the results, thus providing a more complete picture of the determination of the volume of the dispensed liquid.

In another embodiment, the method of the present invention contemplates verification of the volume dispensed by the dispenser. This method further comprises a step of comparing the determined dispensed volume with the theoretical dispensed volume of the dispenser. This comparison may be conducted by the analyst who determined the dispensed volume or by the user of the dispenser.

In another aspect of the present invention, the method includes adjusting the liquid dispenser to correct for any deviation between the actual dispensed volume and the theoretical dispensed volume of the dispenser. In the adjusting step, the liquid dispenser is manipulated so that it has a new theoretical dispensed volume that matches the determined volume. The steps of obtaining information, comparing and adjusting may be conducted iteratively to equalize the actual and theoretical volumes of the dispenser. Alternately, the adjusting step may include applying a correction factor to each dispensing action of the dispenser. For example, the correction factor may take the form of an amount of volume that is added, subtracted or otherwise adjusted from the theoretical volume in order to achieve a more accurate calculation based on volume. Such correction factors may be applied to previous, current or future liquid dispensing activities.

In addition, a suitable distinguishing indicator such as a colorant, dye, pigment or the like may optionally be added to the first liquid, second liquid or both to help distinguish the liquids from each other. In one preferred embodiment, a salt with the same anion as the salt selected for the first liquid is used as a colorant. For example, a chromium chloride colorant would be preferred for use with a $CaCl_2$ containing first liquid. In a preferred embodiment, the colorant is used in amounts that do not detectably alter the RI of the first or second liquids on the test mixture. For example, 0.2% by weight of chromium chloride may be used as a greenish-tint colorant. In this manner, confusion of the user among the liquids and mixtures can be reduced.

In one preferred embodiment, the first and second liquids are provided in a manner that limits or eliminates evaporative lose of the liquid before, after or during use. Evaporative lose of liquid may alter the concentration of the first liquid before its use. Alternatively, evaporative loss may alter the volume of the second liquid before use or the concentration of the test mixture between the time of preparation and the time of analysis. Thus, evaporative loss may be an error source that would be desirable to limit or eliminate.

For example, limiting evaporative loss may be done by producing the first liquid immediately prior to use or using the first liquid before evaporation has a chance to change the concentration of the liquid. Likewise, limiting the evaporative loss for the second liquid may be done by dispensing the known volume of second liquid immediately prior to combination with the second liquid to produce the test mixture. Limiting evaporative loss for the test mixture may be done by analyzing the mixture immediate upon preparation.

Alternately, sealed vessels may be used to store the first and second liquids and/or the test mixture. Suitable sealed vessels may include any liquid holder that includes an access point that may be sealed against the liquid. Suitable vessels include plastic vessels, glass vessels, or combinations thereof (e.g. glass lined or coated receptacles). Suitable sealed vessels may include screw-on caps and snap close caps, along with appropriate seals (e.g. O-rings) and/or an appropriate grease that is insoluble relative to the liquids contained therein.

The vessels may also include valves or other devices to facilitate the combination of the first liquid and the second liquid, while minimizing potential sources of error. For example, unidirectional valve (e.g. a check valve) on the second liquid vessel may be used for keeping the second liquid from being corrupted because of spillage.

In another aspect of the present invention, the present method of dispensed volume determination, dispenser verification, or both may be used in conjunction with other volumetric accuracy techniques such as gravimetry, photometry and/or volumetry.

One embodiment of the present invention comprises systems suitable for carrying out some or all of the steps of the method determining the volume dispensed by the dispenser or the method of verifying the volumetric accuracy of the dispenser. The system may include a refractometer (such as one discussed previously) to complete the RI analysis of the various liquids, i.e., the first liquid, the second liquid and/or the test mixture.

As part of the system and associated with the refractometer may be a suitable output device, electronics, data transfer, communication lines, or a combination thereof. The results of the RI analysis may be inputted by a user or communicated from the refractometer to suitable electronics (e.g. a computer system) for performing any on all of the steps of the methods discussed. For example, a computer system may obtain information about the volume dispensed from the dispenser based on the results of the RI analysis, correlate the results of the RI analysis to the volume dispensed by the dispenser, curve fit the RI of the test mixture, determine the volume dispensed by the dispenser in question or any combinations thereof. In another example, the computer may be programmed with one or more of the above discussed (poly)nomials so that upon detection of a signal from the refractometer, the computer automatically obtains information about volume dispensed.

Likewise, the computer may also be used to compare the determined actual dispensed volume to the theoretical dispensed volume. The computer may also be used to communicate results of the determination or comparison to the user of the refractometer on the liquid dispenser.

The computer system may include suitable computer executable instructions to carry out any and all the functionality that may be required or desirable to carry out the steps of the disclosed methods or to operate the disclosed systems. The computer system may include computer-executable instructions, computer-readable media, and communication media. Computer-executable instructions (e.g. software and software updates), such as program modules (e.g. routines, programs, objects, components, data structures, and so forth), may be executed by one or more computers or other devices and perform particular tasks or implement particular abstract data types. Computer-executable instructions, such as program modules, may be implemented on, or associated with, various computer-readable media. Communication media typically embody computer-executable instructions, in a modulated data signal such as a carrier wave or other transport mechanism and include any information delivery media. By way of example, and not limitation, communication media include wired media such as a wired network or direct-wired connection, and wireless media such as acoustic, RF infrared, infrared, and the like. Combinations of any of the above should also be included with the scope of computer-readable media.

Other functionalities may optionally be added on or built into the system including environmental control device (e.g. a heater for controlling temperature of the sample), particularly for controlling conditions reproducible and consistent manner, automated sample handling (e.g. a robot arm for manipulating sample vessels, for dispensing liquid (e.g. test mixture) onto the refractor or both), or combinations there of or the like. One preferred approach toward temperature control is to employ a device that adjusts the temperature of the test sample to a predetermined temperature prior to taking an RI.

One embodiment of the present invention, whether included as part of one of the inventive systems or not, contemplates a kit for facilitating the methods of the present invention or any step of these methods such as preparing of the test mixture, obtaining information about the dispensed volume, or the like. Such a kit may include at least one vessel of the first liquid or at least one vessel of the second liquid, where the vessels are preferably sealed. Preferably, the kit has one first liquid vessel and a plurality of second liquid vessels. The kit may utilize an indicator to distinguish between the first liquid and the second liquid. The indicator may be a visual, a tactile or a similar indicator. Suitable visual indicators include a marking on container or packaging of the vessels or on the vessels themselves. Alternately, the visual indicator may include different sizes, shapes, colors and combinations thereof utilized for the vessels or different colors for the first and second liquids.

In addition, the kit may optionally include additional components that are useful in the methods or systems of the present invention. These optional components include, but are not limited to, trays, mailers, labels, packing materials, tracking information, absorbent material to handle spillage, instructions for the use of the kit, login instructions, authorization codes, identification devices unique to the user (e.g. a RFID, a bar code, an encoded card or the like), instructions communicating information to a service provide instructions for payment for the kit, services rendered, or both, interpretive information, and combinations thereof. Other optional components of the kit include one or more computer systems, refractometer, or both.

In still another aspect of the invention there is contemplated a method of providing a dispenser verification service operated by a service provider. In this method, a user uses one or more dispensers in need of verifying the accuracy of their dispensing action to prepare test mixtures. The test mixtures are then analyzed by an analyst using refraction. In one embodiment, the user may utilize one or more of the kits discussed above to prepare the test mixtures. The kits may be provided by the service provider or obtained from a third party.

The user (e.g. a subscriber or customer) typically prepares the test mixtures remotely relatively to the RI analysis site (e.g. the site of the service provider). For example, remote may mean in separate rooms of a building, on different floors of a building, in different building within a campus (e.g. university, corporate or government agency), or in different governmental districts (e.g. different municipalities, counties, states or countries). In this embodiment, after preparation, the test mixture is typically transported to an analyst (e.g. an employee or agent of the service provider), who conducts the RI analysis. Any suitable transportation method may be used to move the test mixture to the analyst; e.g. postal service, express courier, independent mobile courier, service provider courier, or the like. In another embodiment, the dispenser is transported to the analyst and the test mixture is prepared at the site of the RI analysis. In another embodiment, a mobile refractometer is transported to the general vicinity of the dispenser to be tested. For example, a refractometer (optionally portable) may be transported by or for a service provider in a mobile vehicle (e.g. a truck). In one embodiment, the dispenser verification service may be carried out in the mobile vehicle such that test mixture may be prepared, refractometry carried out, information about the dispenser obtained, and optionally a recalibration or other adjustment performed based upon the information obtained, in operations performed from the vehicle.

Once the test mixtures (or dispensers) are transported to the analyst, then the RI analysis is carried out and the determination of the dispensed volumes completed. The analyst then may conduct the comparison of the determined dispensed volume with the theoretical dispensed volume. Alternately, the analyst may only provide the determined dispensed volume to the dispenser user so that they may do their own comparison. As can be appreciated from the teaching herein, one embodiment envisions the analyst as a different entity than the dispenser user. However, the two may be the same. Thus, the analyst may be the person who performs the steps of preparing the test mixture as well as performing the RI testing itself, and possibly the readjusting or calibrating step. As to the latter, the service provider may simply provide (at a single or per subscription of periodic occurrences) services of offering refractometer for sale, repairing refractometers, supplying kits (as described herein), supplying components, calibrating dispensers, and combinations thereof.

The data generated by the determination of volume may be provided in either or both machine and human readable forms. For example, a paper report may be generated that includes the results of one or more volume determinations. On the other hand, the data may be placed on computer media (e.g. hard drive, CD, etc.) or placed on a network accessible computer (e.g. a web server). Further, the data may be included as part of a database that may be used to track the performance of a dispenser over time. In addition, additional information exchange may take place between the service provider and user of the service, including financial transactions (e.g. online payments), customer service, periodic reminders, communications (e.g. via email), or the like.

As indicated, one particular method of the present invention includes steps of offering a subscription service to a user. For the service, at periodic intervals, the user is repeatedly sent the liquid used in the present invention (e.g. in a kit). The user then prepares the test mixture using its dispenser being analyzed and forwards the test mixtures to an analyst at a remote site. The analyst performs the RI testing and reports the results to the user by printed communication, voice communication, electronic communication or a combination thereof (e.g. as selected by the user).

In another embodiment, while the test mixture preparation and refractometry may be carried out in one location (or separate locations), the resultant RI of the test mixture may be transmitted (e.g. via the Internet) to another location where information about the volume of dispensed liquid is obtained. The results of the volume determination may then be retransmitted to the original location (e.g. via email) or otherwise made accessible (e.g. posted on a website).

In one aspect of the present invention, there is contemplated a system and method wherein the first liquid and the second liquid are supplied to a user by or at the direction of a first entity that is different from and preferably remotely located from the user. The user dispenses one or both such fluids as taught herein, and sends the dispensed fluid to the first entity for RI analysis conducted by or for the first entity. That is, the user performs no RI testing.

In another aspect, there is contemplated a system and method wherein the first liquid and the second liquid are supplied to a user by or at the direction of the first entity. The user dispenses one or both such fluids as taught herein, but instead of sending the dispensed fluid to the first entity for RI analysis, the user performs its own RI testing using an instrument supplied by the first entity.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions, geometries, concentrations and amounts of the various embodiments depicted herein are not intended to be restrictive of the invention, and others are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A method of determining the volume of liquid dispensed by a dispenser, comprising:
   providing a dispenser having a first liquid with a first refractive index;
   dispensing the first liquid from the dispenser into a vessel having a second liquid with a known volume and a second refractive index to form a test mixture including the first and second liquid;
   measuring a third refractive index of the test mixture;
   correlating the third refractive index of the test mixture with the first refractive index of the first liquid; and
   obtaining information about the volume of the first liquid dispensed based on the correlating step.

2. The method of claim 1 wherein the first liquid is a solution of a solute in water.

3. The method of claim 2 wherein the solute is $CaCl_2$.

4. The method of claim 3 wherein the first liquid is a 40% by weight solution of $CaCl_2$ in water.

5. The method of claim 4 wherein the refractive index of the first liquid is 1.44200.

6. The method of claim 1 wherein the second liquid is between about 0.50000 and about 10.00000 ml of water.

7. The method of claim 6 wherein the second liquid is deionized water.

8. The method of claim 1 wherein the first liquid, the second liquid or both comprise a colorant.

9. The method of claim 1 wherein the correlating step comprises curve fitting the refractive index of the test mixture to determine the volume dispensed by the dispenser.

10. A method for verifying the volumetric accuracy of a dispencer, comprising:
    combining a liquid including a 40% wt of $CaCl_2$ having a known refractive index with a second liquid consisting essential of water with a known volume and a known refractive index to form a test mixture;
    measuring a refractive index of the test mixture; and
    calculating the volume of the first liquid that was combined with the second liquid ($V_d$) using:

$$V_d = \frac{V_2 P_2 X}{P_1(X_1 - X)},$$

where $V_2$ is the volume of the second liquid $P_2$ is density of the second liquid, $P_1$ is the density of the first liquid, $X_1$ is the concentration by weight of the solute in the first liquid and X is the concentration that results from the curve fitting of the RI of the test mixture.

11. The method of claim 10 further comprising comparing the volume of the first liquid with the theoretical volume of liquid dispensed by the dispenser.

12. The method of claim 11, further comprising adjusting the dispenser.

13. The method of claim 10 whereinthe first liquid comprises a 40 wt % solution of $CaCl_2$ in water.

* * * * *